Dec. 2, 1969    A. L. SHREVE III, ET AL    3,481,453
DISPLAY CARTON FOR POWER TOOLS AND THE LIKE
Filed Feb. 23, 1968    8 Sheets-Sheet 1

INVENTORS
ARTHUR L. SHREVE, III
LYELL BAYNE NORRIS, JR.
ROBERT W. BEICHLER
BY Joseph R. Slotnik
ATTORNEY INVENTORS
ARTHUR L. SHREVE, III
LYELL BAYNE NORRIS, JR.
ROBERT W. BEICHLER
BY *Joseph R. Slotnik*
ATTORNEY Dec. 2, 1969      A. L. SHREVE III, ET AL      3,481,453
DISPLAY CARTON FOR POWER TOOLS AND THE LIKE
Filed Feb. 23, 1968      8 Sheets-Sheet 4

INVENTORS
ARTHUR L. SHREVE, III
LYELL BAYNE NORRIS, JR.
ROBERT W. BEICHLER
BY Joseph R. Slotnick
ATTORNEY Dec. 2, 1969  A. L. SHREVE III, ET AL  3,481,453
DISPLAY CARTON FOR POWER TOOLS AND THE LIKE
Filed Feb. 23, 1968  8 Sheets-Sheet 6

INVENTORS
ARTHUR L. SHREVE, III
LYELL BAYNE NORRIS, JR.
ROBERT W. BEICHLER
BY Joseph R. Slotnick
ATTORNEY Dec. 2, 1969  A. L. SHREVE III, ET AL  3,481,453
DISPLAY CARTON FOR POWER TOOLS AND THE LIKE
Filed Feb. 23, 1968  8 Sheets-Sheet 7

INVENTORS
ARTHUR L. SHREVE, III
LYELL BAYNE NORRIS, JR.
ROBERT W. BEICHLER
BY Joseph R. Slotnick
ATTORNEY

United States Patent Office 3,481,453
Patented Dec. 2, 1969

---

3,481,453
DISPLAY CARTON FOR POWER TOOLS AND THE LIKE
Arthur L. Shreve III, Butler, Lyell Bayne Norris, Jr., Towson, and Robert W. Beichler, Baltimore, Md., assignors, by direct and mesne assignments, to The Black and Decker Manufacturing Company, Towson, Md., a corporation of Maryland
Filed Feb. 23, 1968, Ser. No. 707,715
Int. Cl. B65d 5/50, 25/00
U.S. Cl. 206—45.14                          16 Claims

ABSTRACT OF THE DISCLOSURE

The article disclosed herein is a folding carton, commonly referred to as a see-through carton, which is adapted to embrace and support a portable power tool or the like while at the same time exposing the tool for visual display. The carton is fabricated preferably from a corrugated or solid fiberboard blank cut and folded to form a straight-sided polygonal frame detachably connected at its ends. The tool, or other commodity, is disposed within the carton and is rigidly supported thereby while being exposed for nearly full visual view.

BRIEF SUMMARY OF THE INVENTION

The present invention deals with the cross sectional configuration and interrelated and interconnecting corner construction of the polygonal frame-type or see-through carton described above. The carton is fabricated from an integral, elongated blank folded longitudinally in a manner to form sections of rigid, reinforced cross-sectional configuration. The blank is diecut, including all scoring, and slitting necessary so that the reinforced sections can be folded along transverse fold lines and the ends of the blank detachably connected to form a polygonal frame-type or see-through carton. The carton is devoid of adhesives or other special, separate connectors, and the corners formed by the transverse folding interfit in a fashion which provides great strength and rigidity and which makes the carton self-sustaining and capable of supporting a relatively heavy commodity, such as a portable power tool. The tool (or other commodity) is positioned in or removed from the carton in easy fashion by virtue of the detachably connected carton ends and the absence of adhesives and separate connectors. After assembly of the tool and carton, it may be overwrapped by a clear plastic shroud to protect the tool from dirt, dust or other foreign matter and to reduce pilferage while facilitating attractive "on-the-shelf" display of the tool. In addition, this construction readily facilitates shipping of the tools in compact, protective boxes from which they are readily removed for on-the-shelf display as described above.

Main objects of the present invention, therefore, are to provide an improved, self-sustaining, see-through display carton for portable power tools or the like, which carton is adapted to embrace and rigidly support the tool.

Additional important objects of the present invention are to provide an improved carton of the above character which is formed substantially from a single blank and which is devoid of any adhesives as well as cumbersome or expensive special or separate connectors.

Further important objects are to provide an improved carton of the above character which facilitates easy and safe tool shipment and on-the-shelf display, which may embody a protective transparent plastic shroud to protect the packaged tool from dirt, dust, etc., which reduces pilferage and which facilitates on-the-shelf display, and which is versatile in that it can be readily adapted for a variety of commodities, of various sizes and shapes.

Still further objects of the present invention are to provide an improved carton of the above character which is relatively inexpensive to manufacture, rugged in construction, neat and aesthetically pleasing in appearance and reliable in use.

Other objects and advantages of the present invention will become more apparent from a consideration of the detailed description to follow taken in conjunction with the drawings appended hereto.

BROAD STATEMENT OF THE INVENTION

Broadly described, the present invention relates to a display carton comprising a plurality of straight wall panels integrally interconnected with one another along corner fold lines, said wall panels being disposed with adjacent ones thereof angularly related, at least one flange panel flanking each wall panel on either side thereof, at least one reinforcing panel flanking each outermost flange panel, said flange and reinforcing panels being spaced from flanking ones of each other and from said wall panel by longitudinal fold lines, the reinforcing panels on opposite sides of and associated with each said wall panel being adapted to operatively engage and cooperate to maintain a predetermined positional relationship between each wall panel and the flange and reinforcing panels associated therewith, selected ones of said flange being adapted to interfit with selected ones of the flange panels associated with adjacent ones of said wall panels, means integrally associated with an adapted to detachably interconnect the endmost ones of said wall panels, whereby to provide a rigid, self sustaining carton.

In another aspect, the present invention includes a display carton comprising a plurality of straight wall sections integrally interconnected at transverse fold lines therebetween and together forming a closed polygon, each of said wall sections including a wall panel, flange panel means flanking each side of said wall panel and reinforcing panel means flanking the outer side of each said flange panel means, each flange panel means including at least one panel, each reinforcing panel means including at least one panel, each of the panels of said flange panel means, said reinforcing panel means and said wall panel being defined by and spaced from adjacent panels by longitudinal fold lines, the panels of each said wall section being adapted, when folded along said longitudinal fold lines, to cooperatively engage and define wall sections having a rigid, predetermined cross-sectional configuration, the flange panels of adjacent ones of the wall sections being adapted to cooperatively interfit, and other panels of adjacent ones of the wall sections being adapted to abuttingly engage when said wall sections are folded along said transverse fold lines, and means integrally associated with and detachably connecting the endmost two of said wall sections, whereby to provide a rigid, self-sustaining, see-through carton.

In another aspect, the present invention includes a display carton comprising a plurality of straight wall sections integrally interconnected at transverse fold lines therebetween and together forming a closed, polygonal, frame-type carton adapted to entrap and support a portable power tool or the like therein, each of said wall sections comprising a plurality of straight panels disposed generally in side-by-side relation and separated from each other by longitudinal fold lines, said panels of each said wall section being foldable along said longitudinal fold lines and mutually cooperable to define a rigid, predetermined, cross-sectional configuration, said wall sections, when folded relative to adjacent ones thereof, having selected ones of the panels thereof interfitting with and abutting against selected ones of the panels to adjacent wall sections, whereby to reinforce said carton, and means integrated with and detachably interconnecting the endmost two of said wall sections, whereby to facilitate assembly and disassembly of said carton.

In still another aspect, the present invention includes a display and shipping carton construction for portable power tools and the like comprising a plurality of straight wall sections interconnected at trasverse fold lines therebetween and at least two of which are generally parallel, each of said sections including a plurality of panels interconnected along longitudinal fold lines and operatively engageable to form a rigid, predetermined cross-section, selected panels of adjacent wall sections being adapted to interfit and abuttingly engage when said wall sections are folded along said transverse fold lines, whereby to reinforce said carton, means integrated with two adjacent ones of said wall sections for detachably securing them together, a clear plastic shroud covering said carton, and an open ended sleeve adapted to slidably fit over said parallel wall sections and substantially co-extensive with said carton.

DETAILED DESCRIPTION

Figure 1:
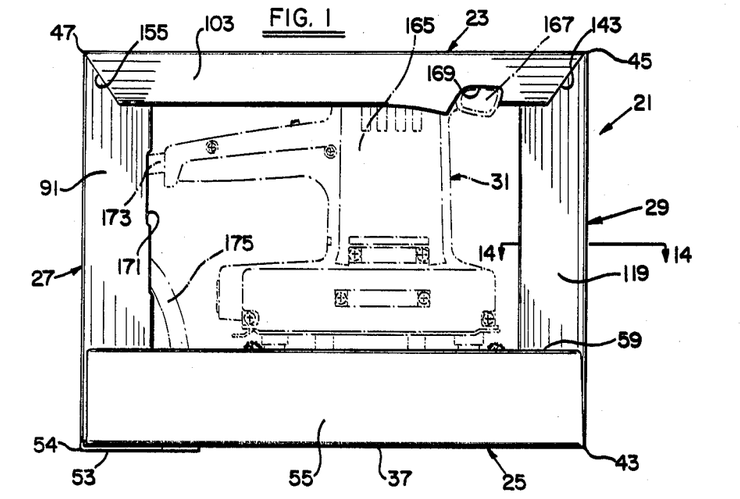
FIG. 1 is a front elevational view illustrating a see-through display carton embodying a preferred form of the present invention and with a portable power tool, shown in dot-dash lines, supported therein.
Figures 4, 5, 6, 13, 14:
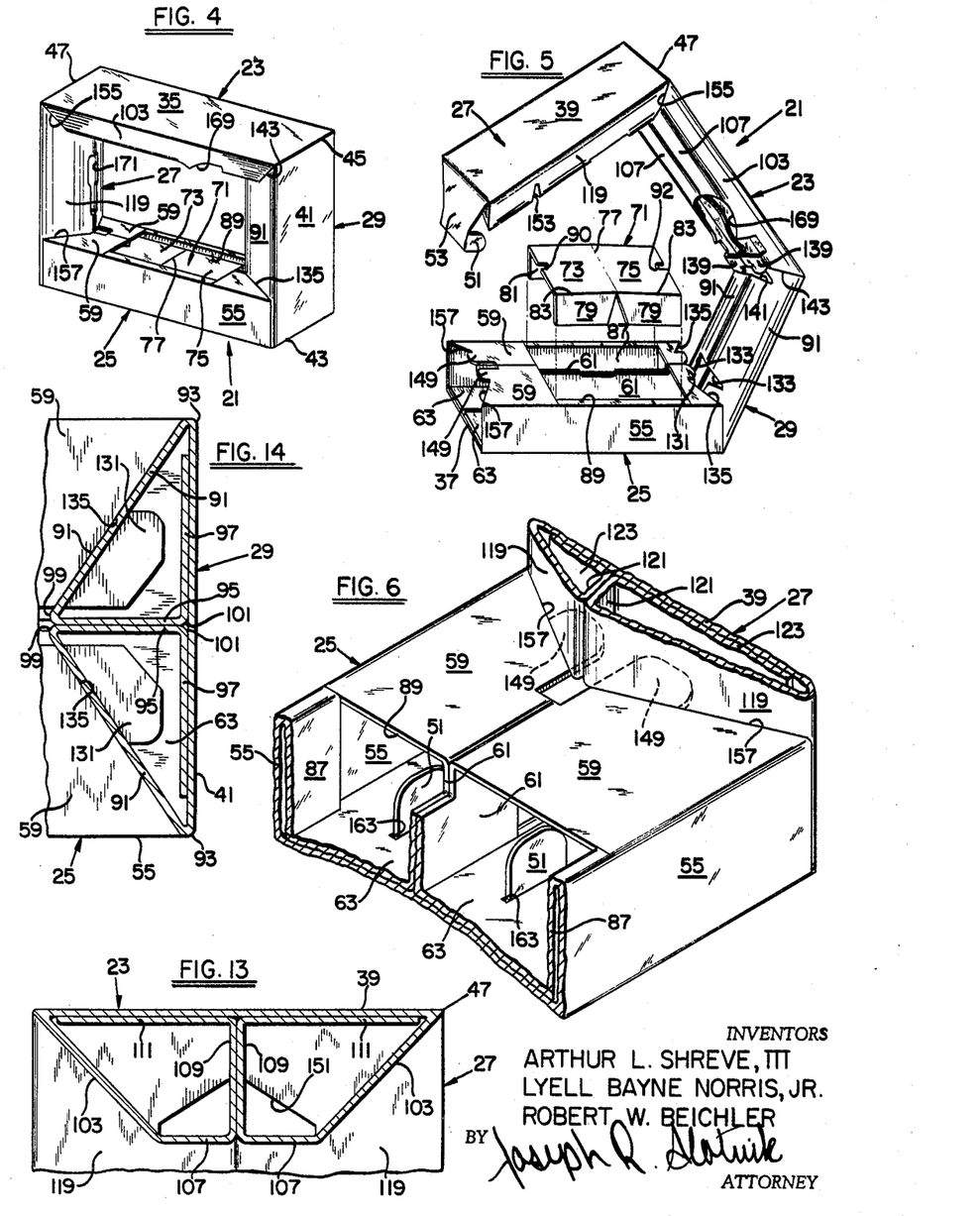
FIG. 4 is a perspective view, to a reduced scale, of the carton of FIG. 1 and shown with the tool removed.
FIG. 5 is a view, similar to FIG. 4, but with the carton ends detached and the sections thereof partly unfolded.
FIG. 6 is a fragmentary, enlarged, perspective view illustrating one interfitted corner of the carton of FIGS. 1 and 4.
FIG. 13 is a sectional view of FIG. 7 taken along the line 13—13 thereof.
FIG. 14 is an enlarged sectional view of FIG. 1 taken along the line 14—14 thereof.

Referring now more specifically to the drawings, a preferred form of carton embodying the present invention is illustrated generally at 21 in FIGS. 1 and 4 and seen to have a generally rectangular configuration having a top 23, a bottom 25 and interconnecting sides 27, 29 which encompass and support, in this case, a portable electric sander 31. However, it is to be understood that this particular rectangular configuration as well as the tool encompassed therein are illustrative only and that the carton of the present invention may take any one of a variety of closed, polygonal shapes. In addition, the commodity encompassed and supported thereby may be another power tool or any of a variety of relatively small, heavy commodities, particularly those which are sold off-the-shelf.

Figure 2:
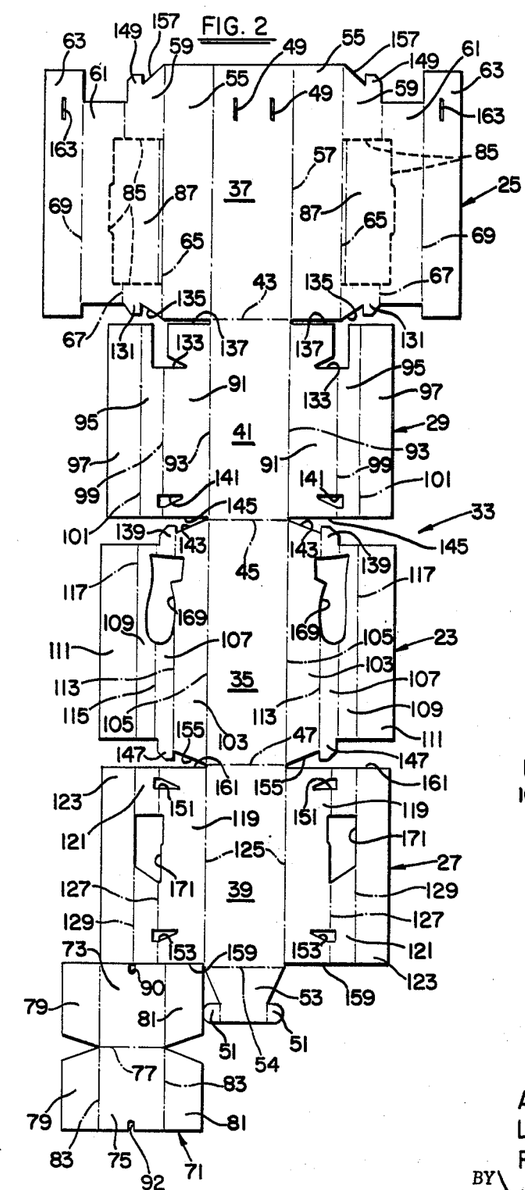
FIG. 2 is a plan view illustrating the blank from which the carton of FIG. 1 is made.

With this in mind, and turning now to FIG. 2, the blank from which the carton 21 is made is illustrated generally at 33 and is shown with the top, bottom and side sections 23, 25, 27, 29 before the panels forming these sections have been folded. Each of these carton sections includes a wall panel 35, 37, 39, 41, respectively integrally interconnected in end-to-end fashion along corner or transverse fold lines 43, 45, 47. The endmost wall panels 37, 39 are provided with slots 49 and a connecting flap 53, respectively, integrally associated therewith. The slots 49 are adapted to removably receive projecting ears 51 formed on the connecting flap. Thus, when the carton is wrapped about the tool 31, the endmost wall panels 37, 39 are put end-to-end and the ears 51 on the flap 53 are inserted into the slots 49.

Each of the wall panels has flange panel means and reinforcing panel means flanking either side of the wall panels and the flange panel means, respectively, and defined by and adapted to be folded along longitudinal fold lines. As shown in FIG. 2, the bottom wall panel 37 has at least one and in this case two pairs of flange panels 55, 59 spaced from the wall panel 37 and from each other by fold lines 57, 65, respectively. A set of two reinforcing panels 61, 63 flanks each outermost flange panel 59 at the outermost edge thereof and is separated therefrom by longitudinal fold lines 67, 67 while longitudinal fold lines 69, 69 separate the reinforcing panels 61, 63 of each set from each other. When folded, the outermost reinforcing panels 63, 63 of the bottom section 25 overlay the wall panel 37 and abut edgewise against the flange panels 55, 55, the innermost reinforcing panels 61, 61 abut in face-to-face fashion and the flange panels 59, 59 abut edge-to-edge, as seen in FIG. 10, to form substantially a reinforced, divided rectangular cross-sectional configuration which is capable of supporting relatively heavy weight without collapsing.

Figure 10:
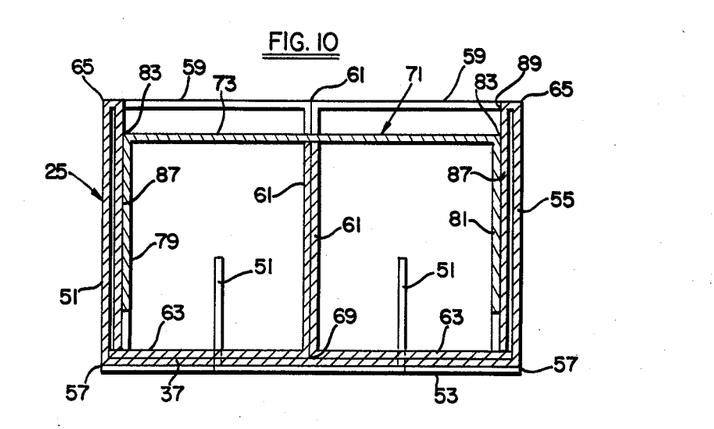
FIG. 10 is a sectional view of FIG. 7 taken along the line 10—10 thereof.
Figures 11, 12:
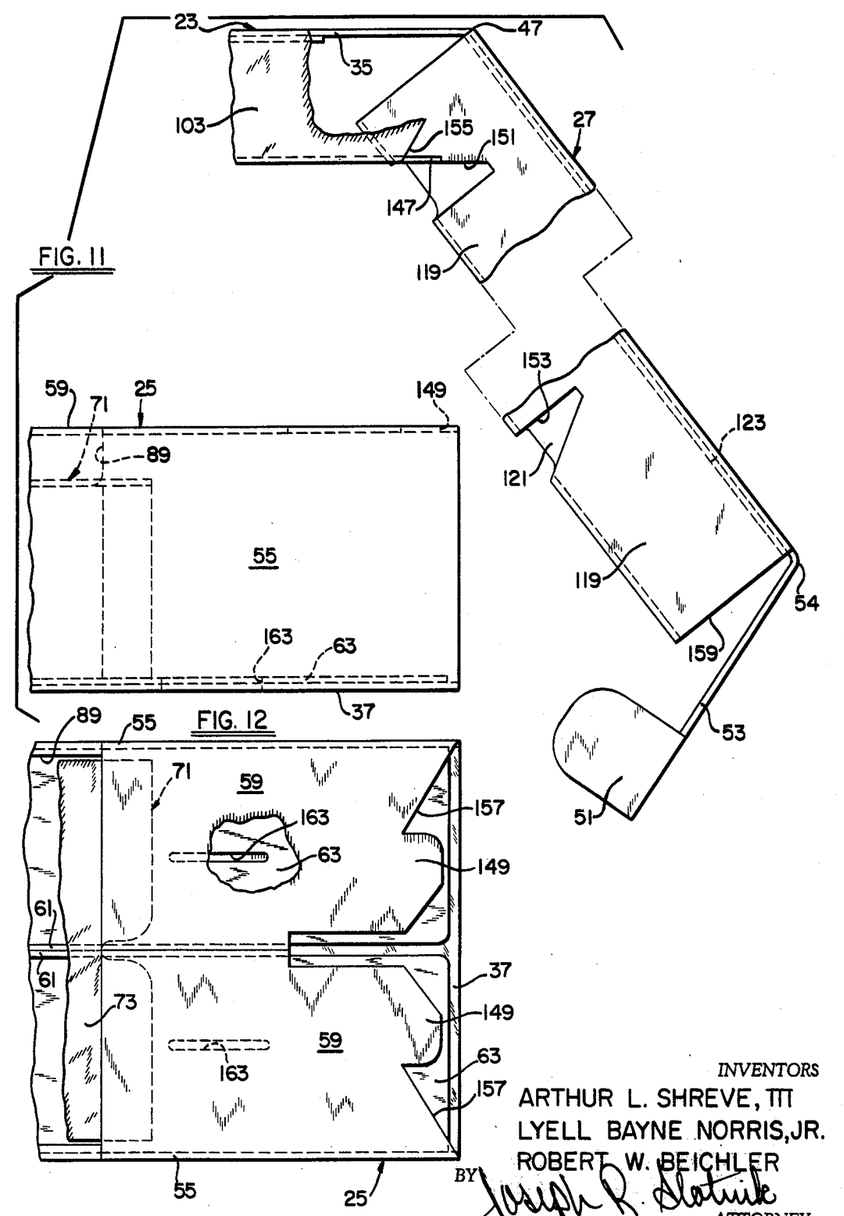
FIG. 11 is a view similar to FIG. 7 but showing the ends of the carton detached and the corner partly unfolded.
FIG. 12 is a top plan view of a portion of FIG. 11 and shown with portions broken away for clarity.

It will be seen in FIGS. 3–5 and 10 that if desired, a tool supporting platform 71 may be employed with the bottom carton section 25 to help support the tool 31. The platform 71 shown comprises top panels 73, 75 separated by a fold line 77, and a pair of side panels 79, 81 flanking each top panel 73, 75 and separated therefrom by fold lines 83. The blank from which the supporting platform 71 results may be formed simultaneously with the carton blank 33, and, as such, is seen in FIG. 2. If the platform 71 is used, then the flange panels 59, 59 and the inforcing panels, 61, 61 of the bottom box section 25 are knifed along lines 85, as shown in FIG. 2, forming fold-out panels 87 which can be folded back on flange panels 55 as shown in FIG. 10. Thereafter, the platform 71 is inserted into a slot 89 vacated by the panels 87 so that the platform side panels 79 bear against the fold-out panels 87. The combined length of the platform top panels 73, 75 is slightly greater than the length of this slot 89 so that by folding the platform 71 along line 77, inserting it into the slot 89, and thereafter straightening the platform 71, it is retained in the slot 89 without requiring any faseners. The platform top panels 73, 75 may be slotted, as shown at 90, 92, to interfit with the slitted edges of the reinforcing panels 61 to further stabilize the platform 71 within the slot 89.

Figures 7, 9:
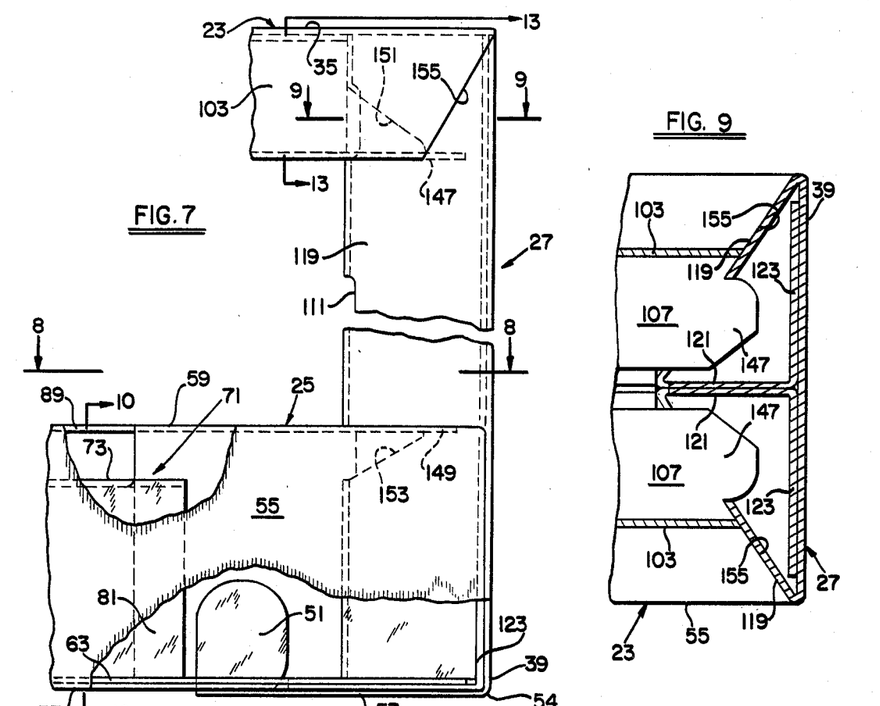
FIG. 7 is an enlarged, fragmentary view of a portion of the carton of FIG. 1 with portions partly broken away for clarity.
FIG. 9 is a sectional view of FIG. 7 taken along the line 9—9 thereof.
Figure 8:
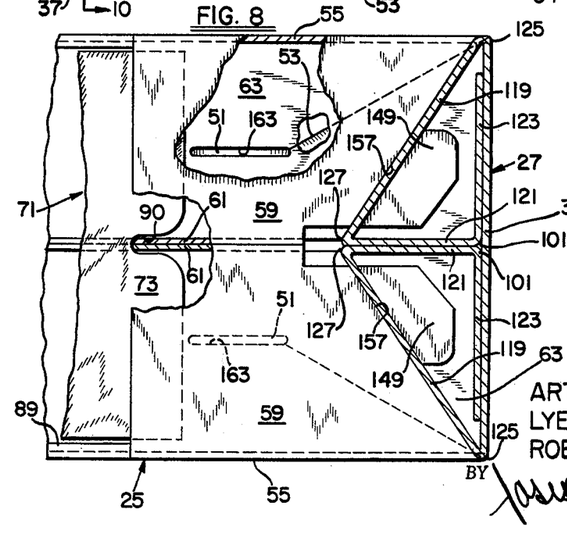
FIG. 8 is a sectional view of FIG. 7 taken along the line 8—8 thereof and with portions thereof broken away for clarity.

The platform top, as shown in FIG. 7, is below the top flange panels 59 of the box bottom section 25 so that when the tool 31 is in position in the carton 21, it sits down in the slot 89. Also, the platform top panels 73, 75 rest on the upwardly facing edges of the reinforcing panels 61, 61 which are maintained in position by the reinforcing panels 63, 63 which bear endwise against the flange panels 55, 55 so that the tool 31 is rigidly supported.

The side section 29 is seen in FIGS. 2 and 14 to include a pair of flange panels 91, 91 separated from the wall panel 41 by longitudinal fold lines 93, 93, and two pairs of reinforcing panels 95, 97 separated from the flange panels 91, 91 and from each other by longitudinal fold lines 99, 101, respectively. When folded, the flange panels 91, 91 abut along fold lines 99, the innermost reinforcing panels 95, 95 abut face-to-face and the outermost reinforcing panels 97, 97 lay against the wall panel 41 and abut edgewise against the flange panels 91, 91, so that the side section 29 is rigid and has a divided, generally triangular cross-sectional configuartion (see FIG. 14).

The top section 23 of the carton 21 is trapezoidal in cross-section and, as shown in FIGS. 2 and 13, the top carton portion 23 includes two pairs of flange panels 103, 103 and 107, 107 flanking the wall panel 35 and separated therefrom and from each other by longitudinal fold lines 105, 105 and 113, 113, respectively. Two sets of reinforcing panels 109, 109 and 111, 111 flank the outermost flange panels 107, 107 and are separated therefrom and from each other by longitudinal fold lines 115, 115 and 117, 117. When folded, the flange panels 107 abut along fold lines 113, the reinforcing panels 109 abut face-to-face and the reinforcing panels 111 lay against the wall panel 35 and abut edgewise against the flange panels 103, 103, as shown in FIG. 13.

The side section 27 is somewhat the same as the side section 29 described above and includes flange panels 119, 119 and reinforcing panels 121, 121 and 123, 123, separated from the wall panels 39 and from each other by longitudinal fold lines 125, 125, 127, 127 and 129, 129. Like the side section 29, the panels of the side section 27 form a divided triangular configuration when folded, with the flange panels 119, 119 abutting along fold lines 127, 127, the reinforcing panels 121, 121 abutting face-to-face and the reinforcing panels 123, 123 laying against the wall panel 39 and abutting edgewise against the flange panels 119, 119.

Figure 3:
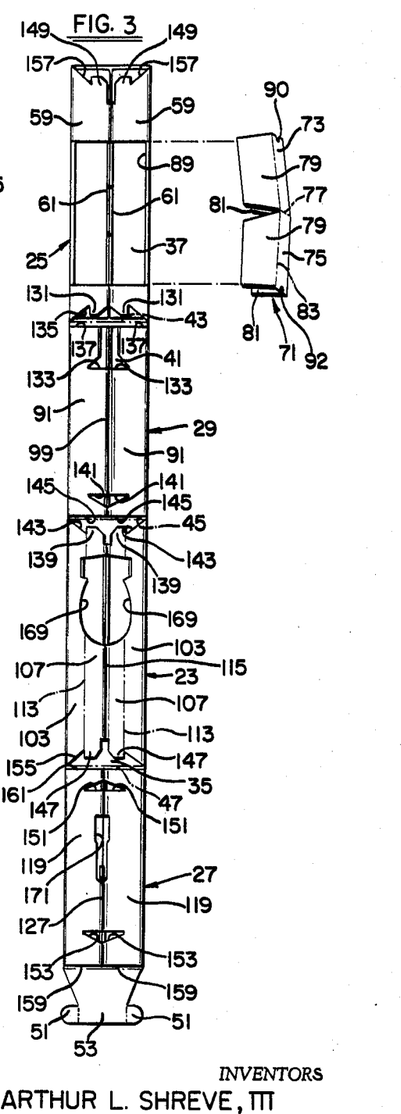
FIG. 3 is a plan view of the blank of FIG. 2 shown after longitudinal folding thereof to form sections of reinforced cross-sectional configuration.

To assemble the carton, the panels of the top, bottom and side sections 23, 25, 27, 29 are folded, as described above to substantially the position illustrated in FIG. 3 and each section is temporarily clamped to maintain its integrity. The platform 71 (if one is used) is then inserted in place in the slot 89 and the tool 31 is set in place thereon. The side section 29 is then folded relative to the bottom section 25 along the corner or transverse fold lines 43 to bring a pair of tabs 131, 131, formed on the flange panels 59, 59 of the bottom section 25, into interfitting relation with a pair of slots 133, 133, formed in the flange and reinforcing panels 91, 91 and 95, 95 of the side section 29. In addition, the flange panels 59, 59 of the bottom section 25 are tapered back toward the tabs 131, 131, as shown at 135, 135, so that when the bottom and side sections 25, 29 are folded along the line 43 and the tabs 131, 131 interfitted with the slots 133, 133, the tapers 135, 135 abut against the flange panels 91, 91 of the side section 29.

Furthermore, end edges 137, 137 on the flange panels 91, 91 abut the reinforcing panels 63, 63 (which lay against the wall panel 37) so that when the bottom and side sections 25, 29 are brought together in this fashion, a rigid interfitting relation is provided at the corner therebetween and this is achieved without requiring any adhesives or separate fasteners.

The next step is to fold the top section 23 relative to the side section 27 along the corner or transverse fold line 45. This brings a pair of tabs 139, 139 on the flange panels 107, 107 of the top section 23, into interfitting relation with a pair of slots 141, 141, formed in the flange and reinforcing panels 91, 91 and 95, 95 of the side section 29. Also, the flange panels 103, 103 of the top section 23, are tapered back toward the tabs 139, 139 as shown at 143, 143 so that when the top section 23 is so folded toward the side section 29, the tapers 143, 143 abut against the flange panels 91, 91.

Furthermore, end edges 145, 145 on the flange panels 91, 91 opposite the end edges 137, 137, abut the reinforcing panels 111, 111 on the top section 23, which reinforcing panels lay against the wall panel 25, so that this corner joint, like the one previously described, is extremely rigid and requires no adhesives or separate fasteners. In addition, the side section 29, by virtue of the flange panel end edges 137, 137 and 145, 145 which abut endwise against the reinforcing panels 63, 63 and the reinforcing panels 111, 111, respectively, forms a compression loaded post or beam between the top and bottom sections 23, 25 which greatly enhances the strength of the carton.

Next, the side section 27 is folded along the corner or transverse fold line 47 relative to the top section 23 until tabe 147, 147, formed on the flange panels 107, 107 of the top section 23, and tabs 149, 149, formed on the flange panels 59, 59 of the bottom section 25, interfit with slots 151, 151 and 153, 153 formed in the flange and reinforcing panels 119, 119 and 121, 121 of the side section 27 adjacent opposite ends thereof. In addition, the flange panels 103, 103 are tapered rearwardly toward the tabs 147, 147, as shown at 155, 155, and the flange panels 59, 59 are tapered rearwardly toward the tabs 149, 149, as shown at 157, 157, so that when the tabs 147, 147 and 149, 149 interfit with the slots 151, 151 and 153, 153, the tapers 155, 155 and 157, 157 abut against the flange panels 119, 119 thereby loading the top section 23 in compression. Also, end edges 159, 159 and 161, 161, at opposite ends of the flange panels 119, 119 abut against the wall panel 35 and the reinforcing panels 63, 63 of the top and bottom sections 23 and 25, respectively, to rigidify these joints and to provide another compression loaded post to strengthen the carton 21.

Finally, the ears 51, 51 on the flap 53 are inserted through the slots 49, 49 in the wall panel 37 and through slots 163, 163 in the reinforcing panels 63, 63 of the bottom section 25 to detachably hold the carton 21 together and compression load the bottom section 25. The carton 21 is thus completely formed and by virtue of interfitted and integral construction, the compression loaded sections and the reinforced corners, this carton 21 is entirely self-sustaining and is highly resistant to being crushed. This may be distinguished from prior commodity carrying cartons which employ separate braces or supports, or in the case of some see-through, frame-type cartons used with toys, are made up of separate and distinct portions, joined together by separate fasteners and which are not "self-sustaining" to the point of being able to support (without separate reinforcement) relatively heavy commodities such as power tools.

The tool 31, shown to be encased and supported by the frame carton 21 in FIG. 1, is seen to be a portable electric sander. This tool 31 conventionally has a flat base or shoe plate (not shown) which is supported upon the platform 71 within the slot 89, and has the upper part of its motor housing 165 and a steadying handle 167 received and trapped in openings 169, 169 formed in the flange panels 103, 103 and 107, 107, and the reinforcing panels 109, 109 of the top section 23. In addition, slots 171, 171 in the flange and reinforcing panels 119, 119 and 121, 121 of the side section are provided to receive a strain relief 173 and line cord 175 of the tool 31, which line cord 175 may also extend into the bottom carton section 25, as appears from FIG. 1. All in all, it will be appreciated that the tool 31 is securely trapped and rigidly supported by the frame carton 21 while being nearly completely exposed for view. If desired, the entire carton and tool package may be overwrapped with a clear plastic film, such as a polyvinyl chloride shrink film, to protect the tool from dirt, dust etc., and to reduce pilferage, and the overwrapped package may be used on shelf displays. However, this overwrapping is not relied upon to hold the carton 21 together since the latter is entirely self-sustaining.

Figures 15, 16:
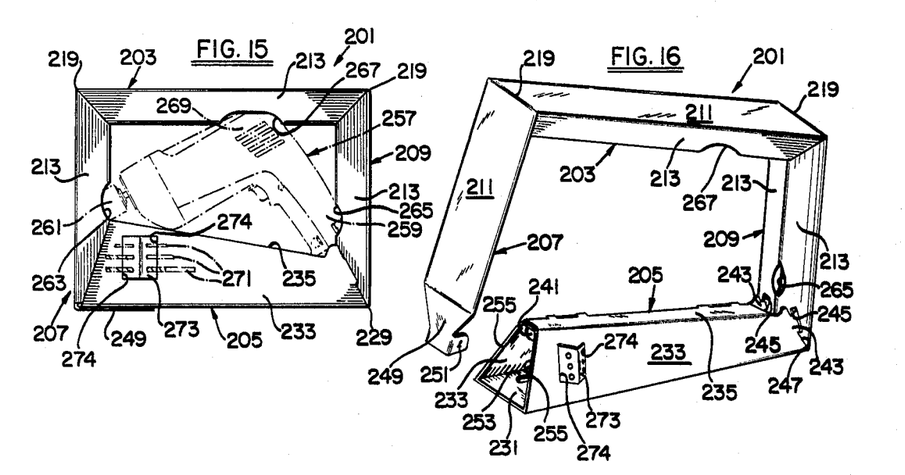
FIG. 15 is a front elevational view illustrating a modified form of display carton and with a portable power tool, shown in dot-dash lines, supported therein.
FIG. 16 is an enlarged, perspective view of the carton of FIG. 15 shown with its ends detached and its corners partially unfolded.

A modified form of this invention is illustrated in FIGS. 15–19. In this embodiment, the carton, illustrated generally at 201 in FIGS. 15 and 16, is seen to be generally rectangular in configuration and has top and bottom sections 203, 205 interconnected by side sections 207, 209. Each of the top 203 and side sections 207, 209 are substantially identical being of triangular cross-sectional configuration. Thus, each of these sections 203, 207, 209 includes a wall panel 211 flanked by a pair of flange panels 213, 213 and two pairs of reinforcing panels 215, 215 and 217, 217, the latter being shown in FIG. 17 for the top section 203 only. As shown there, the flange panels 213, 213 abut substantially end to end, when the panels of the sections 203, 207, 209 are folded, the reinforcing panels 215, 215 abut face-to-face and the reinforcing panels 217, 217 lay against the wall panel 211 and abut edgewise against the flange panels 213, 213.

Figures 17, 18, 19:
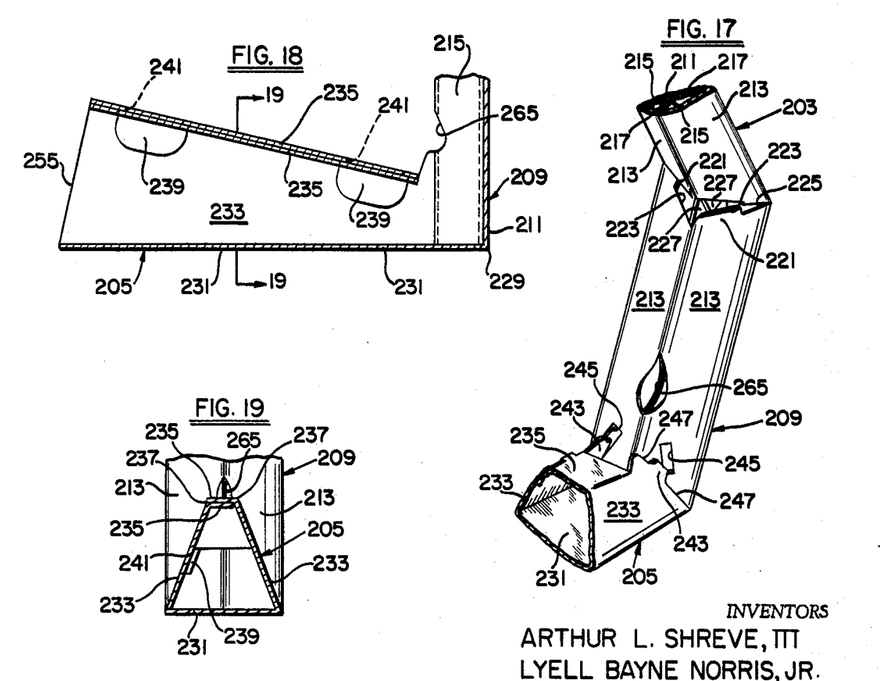
FIG. 17 is an enlarged perspective view of a portion of the structure of FIG. 16 and illustrating the corner construction thereof.
FIG. 18 is an enlarged, vertical sectional view of the base and one interfitted side section of the carton of FIGS. 15 and 16.
FIG. 19 is a sectional view of FIG. 18 taken along the line 19—19 thereof.

As was the case in the embodiment of FIGS. 1–14, the top and side portions 203, 207, 209 are separated by corner or transverse fold lines, illustrated at 219, 219 in FIGS. 15 and 16. After the blank (from which the carton 201 is formed) is diecut, as the blank 33 was diecut as shown in FIG. 2, and folded as shown in FIG. 3, it is then folded along the transverse fold lines between the carton portions 203, 205, 207, 209, which includes the fold lines 219, 219 and a fold line 229 between sections 205 and 209. As the portions 203, 207, 209 are brought together, as shown in FIG. 16, adjacent edges of aligned ones of the flange panels 213, 213 also move toward each other until, as shown in FIG. 17, a tab 221 and recess 223 on the flange panels 213, 213 of portion 209 move into and receive a complementary slot 223 and tab 221, respectively, in the flange panels 213, 213 of portion 203. At the same time, edges 225, 225 on the flange panels 213 of portion 209 adjacent the tab 221 and recess 223, move into abutting engagement with the flange panels 213 of portion 203. In similar fashion, a tab and recess (not shown) at the other ends of the panels 213, 213 of top section 203, move into and receive a similar recess and tab (not shown) formed in the panels 213, 213 of side section 207, while end edges (not shown) similar to end edges 225 on the panels 213, 213 of top section 203 abut the panels 213, 213 of side section 207. In addition, projecting ends 227, 227 on opposite ones of the reinforcing panels 215, 215 of each section 203, 207, 209 are adapted, when the sections 203, 207, 209 are folded to the assembled position shown in FIG. 15, to abut against respective ones of the wall panels 211 of these sections to further rigidify the carton 201.

The bottom carton section 205 is formed somewhat differently than the sections 203, 207, 209. Thus, the section 205 is essentially a funneling trapezoid connected at one end to the side section 209 by the transverse or corner fold line 229 separating the wall panel 211 of portion 209 and a wall panel 231 of bottom section 205. A pair of flange panels 233, 233 flank the wall panel 231 while a pair of reinforcing panels 235, 235 are separated from respective ones of the flange panels 233 by longitudinal fold lines 237, 237. In the assembled position, the reinforcing panels 235, 235 overlay each other, as shown in FIG. 14, and are interconnected by tabs 239, 239 on one panel 235 which are received in slots 241, 241 in the other panel 235.

In assembly of the carton 210, a tool 257 or other commodity is placed on the bottom section 205 and the side section 209 is folded along the transverse fold line 229 relative to the bottom section 205 until projecting tabs 243, 243 on the flange panels 233, 233 thereof interfit in slots 245, 245 in the flange panels 213, 213 of section 209, and edges 247, 247 on flange panels 233, 233 abuttingly engage the flange panels 213, 213 of section 209. The top and side sections 203, 207 are then folded relative to the side and top 209, 203, respectively, until the tabs 221 and recesses 223 interfit, as decribed above. Thereafter, a connecting flap 249, formed as an extension of the wall panel 211 on the side section 207, and which has a pair of tabs 251, 251, is fitted into slots 253, 253 in the wall panel 231. In this, the completely folded position of the carton 201, end edges 255, 255 on the flange panels 233, 233 on the bottom section 205 abut the flange panels 213, 213 on the side section 207. In addition, the top, bottom and side sections 203, 205, 207, 209 are loaded in compression when the carton 201 is formed in somewhat the same fashion as was the carton 21 in the embodiment of FIGS. 1–14, and, like that previous embodiment, the carton 201 is entirely self-sustaining and highly resistant to crushing.

The particular funnel-like configuration of the bottom portion 205 is adapted for use in supporting and displaying a tool of the type such as the electric drill 257, shown by dot-dash lines in FIG. 15. Thus, the drill handle 259 seats in the carton corner formed by sections 205, 209, while the drill spindle and chuck 261 seat in the carton corner formed by sections 205, 207. Section 207 may have a slot 263 therein to receive a portion of the chuck 261 and section 209 a slot 265 to receive the drill line cord and strain relief (not shown). The section 203 has a slot 267 which receives a portion of the drill housing 269. Also, with this drill 257, it may be desirable to include a selected number of drill bits 217 which may be mounted on the carton 201 by means of a mounting flap 273 inserted partly through slots 274, 274 in one of the flange panels 233.

Figures 20, 21, 22:
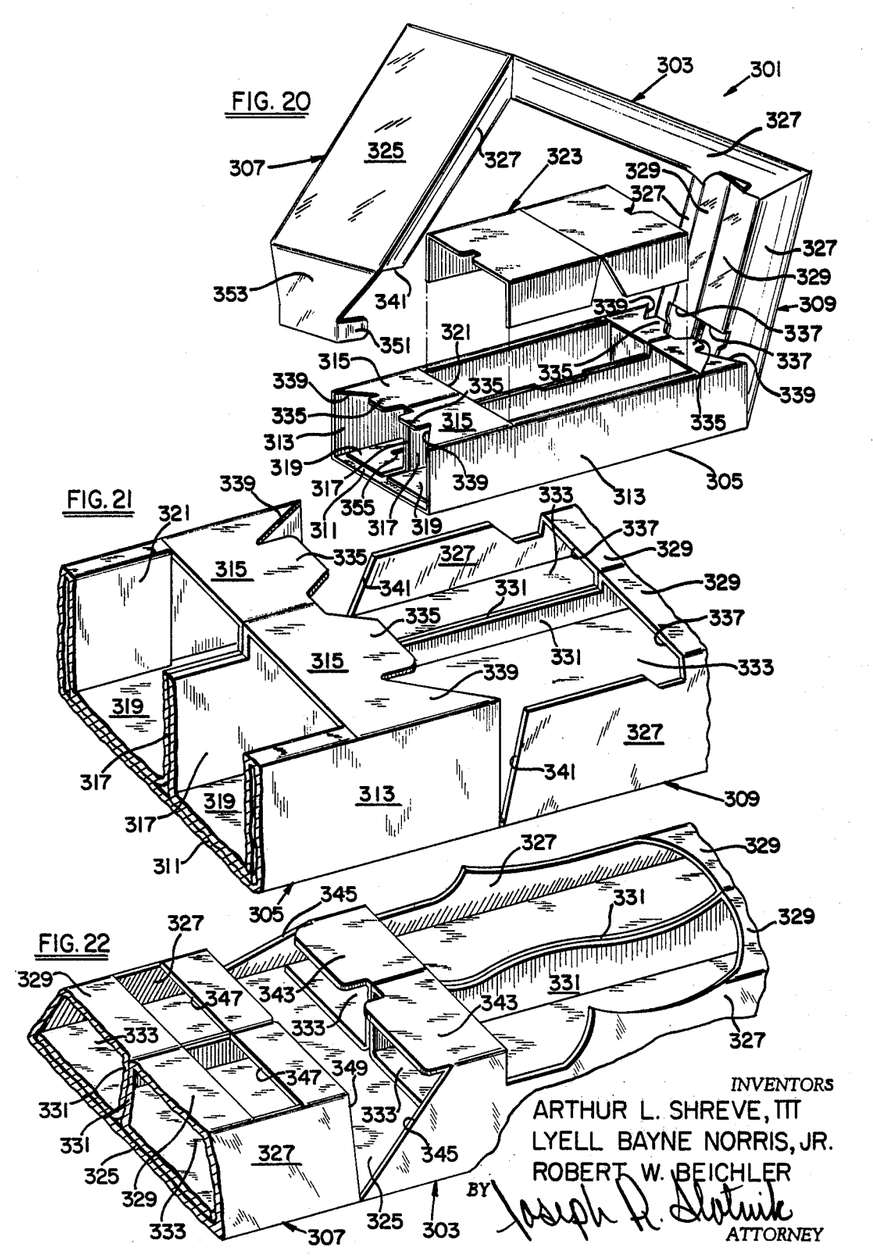
FIG. 20 is a view similar to FIGS. 5 and 16 and illustrating still another form of carton construction embodying the present invention.
FIG. 21 is an enlarged view of one corner of the carton of FIG. 20 and shown fully opened or unfolded.
FIG. 22 is a view similar to FIG. 21 but showing still another corner of the carton.

In still another embodiment, shown in FIGS. 20–22, there is shown a rectangular carton 301 having a top section 303, a bottom section 305, and interconnecting side sections 307, 309. The bottom section 305 is substantially identical to the bottom section 25 of the carton 21 of FIGS. 1–14 and includes a wall panel 311, two pairs of flange panels 313, 313 and 315, 315, and two pairs of reinforcing panels 317, 317 and 319, 319 which, when folded, define a divided rectangular cross-sectional configuration. Also, like the bottom section 25 of FIGS. 1–14, the bottom section 305 may be slotted, as shown at 321, to receive a removable platform 323.

Each of the top 303 and side sections 307, 309 is trapezoidal in cross-section, somewhat like the top section 23 of the carton of FIGS. 1–14. Thus, each section 303, 307, 309 includes a wall panel 325 flanked by two pairs of flange panels 327, 327 and 329, 329 which are, in turn, flanked by two pairs of reinforcing panels 331, 331 and 333, 333. When the panels of each section 303, 307, 309 are folded, the reinforcing panels 333, 333 overlay the wall panels 325 and edgewise abut the flange panels 327, 327, the reinforcing panels 331, 331 abut face-to-face, and the flange panels 329, 329 abut edge-to-edge, as was the case in the embodiment of FIGS. 1–14.

In a fashion similar to the embodiments of FIGS. 1–14 and FIGS. 15–19, the carton 301 is finally assembled by folding the sections 303, 305, 307, 309 along corner fold lines therebetween. As this is done, projecting tabs 335, 335 at each end of the flange panels 315, 315 of the bottom section 305 are received in slots 337, 337 in the flange panels 329, 329 of each side section 307, 309. Also, the flange panels 315, 315 are each tapered rearwardly at each end thereof toward the tabs 335, as shown at 339, which taper abuts against the adjacent flange panel 327 of the side sections 307, 309. Further, an edge 341 at the end of each flange panel 327 of the sections 307, 309, abuts against the reinforcing panels 319 (which overlay the wall panel 311).

In similar fashion, the flange panels 329, 329 of the top section 303 have projecting tabs 343, 343 at each end thereof and are tapered at 345, 345 to fit into and abut slots 347, 347 in the flange panels 329, 329 and the flange panels 327, 327, respectively, of the side sections 307, 309. Also, end edges 349 on the flange panels 327 of each section 307, 309, opposite the end edges 341, abut against the wall panel 325 of the top section 303 when the carton 301 is completely folded. Thus, like the embodiments of FIGS. 1–14 and 15–19, the top, bottom and side sections 303, 305, 307, 309 form compression loaded beams and provide an extremely strong and rigid construction. Furthermore, when the carton 301 is completely folded, ears 351, 351 on a connecting flap 353 are adatped to project into slots 355, 355 in the wall panel 311 and the reinforcing panels 319 to detachably secure the integral box together and render it entirely self-sustaining and free of separate connectors, reinforcement, etc.

Figure 23:
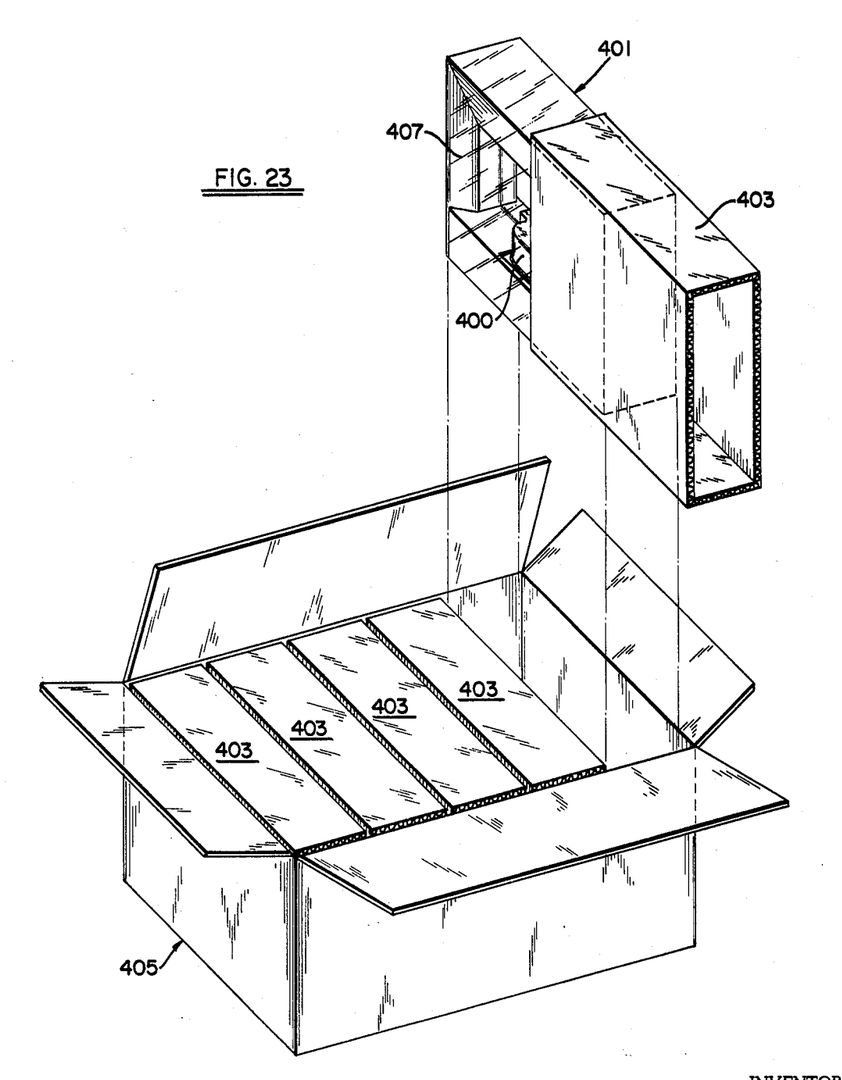
FIG. 23 is a perspective view illustrating a typical box arrangement for tools packaged according to the present invention.

Turning now to FIG. 23, there is illustrated generally at 401 a typical box arrangement for shipping tools, or other commodities, and which may embody any one of the forms described above for FIGS. 1–22. Each of the cartons 401 has a protective sleeve 403, formed of corrugated, fiberboard or the like, snugly but slidably fitted thereover. The sleeve 403 is substantially coextensive with four sides of the carton 401, including the top, bottom, front and back, and is open at its ends. In this illustration, the packaged tools 400 are shipped in units of five in a conventional corrugated fiberboard box 405 sized to accommodate the five cartons in side-by-side fashion. Then, when the box 405 is delivered to, for example, a retail distributor, he can remove one or more of the packaged tools therefrom, slip off the protective sleeve 403 and place the packaged tool or tools for display on his shelf. Desirably, the tool packaging cartons 401 after assembly thereof around the tools 400, are overwrapped with a clear plastic shroud 407 such as, for example 0.75-mil polyvinyl chloride shrink film, to protect the tools 400 from dirt, dust, etc. while on the display shelf, to reduce pilferage, and yet to permit full visual display of the tools 400 and any printed matter on the cartons 401.

By the foregoing, there has been disclosed an improved display carton for power tools and the like, calculated to fulfill the inventive objects hereinabove set forth, and while a preferred embodiment of the present invention has been illustrated and described in detail, various additions, substitutions, modifications and omissions may be made thereto without departing from the spirit of the invention.

We claim:

1. A display carton comprising a plurality of straight wall sections integrally interconnected at transverse fold lines therebetween and together forming a closed frame-like polygon, each of said wall sections including a wall panel, flange panel means flanking each side of said wall panel, and reinforcing panel means flanking the outer side of each said flange panel means, each flange panel means including at least one panel, each reinforcing panel means including at least one panel, each of the panels of said flange panel means, said reinforcing means, and said wall panel means being defined by and spaced from adjacent panels by longitudinal fold lines, the panels of each of said wall section, when folded along said longitudinal fold lines, cooperatively engaging and defining said wall sections each of which has a rigid, predetermined cross-sectional configuration, each of the adjacent wall sections having panels formed with generally complementary tongue and slot means which interengage when said wall sections are folded along said transverse fold lines to mutually reinforce said wall sections and maintain said predetermined cross-sectional configuration, recess means in at least one of the wall section panels to receive a commodity to be supported within said carton, and means integrally associated with and detachably connecting the endmost two of said wall sections.

2. A carton as defined in claim 1 wherein said carton is generally rectangular in configuration and includes top, bottom and side sections, said bottom section having a cut-out area with a commodity supporting platform removably disposed therein.

3. A carton as defined in claim 2 which further includes an open ended sleeve slidably fitted over said wall sections and being substantially coextensive with said carton.

4. A carton as defined in claim 1 wherein said carton is generally rectangular in configuration and has top, bottom and side sections, said top and side sections being triangular in cross-section and each has a flange panel flanking its wall panel along opposite sides thereof and two reinforcing panels flanking each flange panel, said bottom section being trapezoidal in cross-section and having a flange panel flanking said wall panel along each side thereof and a reinforcing panel flanking each flange panel.

5. A carton as defined in claim 1 wherein said carton is generally rectangular in configuration and includes top, bottom and side sections, said top and bottom sections having at least portions of their flange panels in endwise engagement with panels on said side sections whereby said top and bottom sections are loaded in compression.

6. A carton as defined in claim 1 wherein said carton is generally rectangular in configuration and has top, bottom and side sections, at least some of the panels of each said sections being disposed in endwise abutting engagement with panels of the sections at opposite ends thereof, whereby to load each of said sections in compression.

7. A carton as defined in claim 1 wherein said carton is generally rectangular in configuration and has parallel top and bottom and parallel side sections, two of said parallel sections having tabs projecting from opposite ends of flange panel means thereof and received in slots formed in flange panel means of the other two parallel sections, the flange panel means of said first mentioned two parallel sections being tapered rearwardly toward said tabs and presenting edges adapted for endwise abutment with the flange panel means of the other two parallel sections.

8. A carton as defined in claim 1 wherein said carton is generally rectangular in configuration and has parallel top and bottom and parallel side sections, two of said parallel sections having end edges on their flange and reinforcing panel means adapted to abut against panel means on the other two parallel sections.

9. A construction as defined in claim 1 which includes a clear plastic overwrapping encasing said frame-type carton.

10. A carton as defined in claim 1 wherein said connecting means comprises a flap integral with one of said wall panels, said flap having at least a portion thereof receivable in opening means formed in an adjacent one of said wall panels.

11. A carton as defined in claim 1 wherein said carton is generally rectangular in configuration and includes top, bottom and side sections, each of said side sections having an inner and outer flange panel flanking each side of its wall panel, a pair of reinforcing panels flanking each outer flange panel, at least one of the reinforcing panels of each said side section being an endwise abutting engagement with a panel of each said top and bottom sections, whereby said last mentioned reinforcing panels are loaded in compression.

12. A carton as defined in claim 1 wherein said carton is generally rectangular in configuration and has top, bottom and side sections, said top section and said bottom section being trapezoidal and rectangular, respectively, in cross-section and each includes an inner and outer flange panel flanking each side of its wall panel, and two reinforcing panels flanking each outer flange panel, said side sections both being triangular in cross-section and each includes a flange panel flanking each side of its wall panel and two reinforcing panels flanking each said flange panel.

13. A carton as defined in claim 1 wherein said carton is generally rectangular in configuration and has top, bottom and side sections, said top section and side sections being trapezoidal and said bottom section being rectangular in cross-section, each of said sections having an inner and outer flange panel flanking each side of its wall panel, and two reinforcing panels flanking each said outer flange panel.

14. A carton as defined in claim 1 wherein said carton is generally rectangular in configuration and has top, bottom and side sections, said recess means including a cutout in said bottom section for receiving a portion of said commodity.

15. A carton as defined in claim 1 wherein said carton includes top, bottom and side sections, said top and side sections being triangular in cross-section and each including a flange panel flanking each side of its wall panel, and a pair of reinforcing panels flanking one side of each said flange panel, said bottom section being trapezoidal in cross-section.

16. A carton as defined in claim 1 wherein said carton includes top, bottom and side sections, at least one of said sections being generally a funneling trapezoid.

References Cited

UNITED STATES PATENTS

| | | |
|---|---|---|
| 2,450,035 | 9/1948 | De Mian. |
| 2,711,677 | 6/1955 | Stenger. |
| 2,781,898 | 2/1957 | Desmond et al. __ 206—45.31 X |
| 2,834,461 | 5/1958 | Dusseault ______ 206—45.31 X |
| 2,983,371 | 5/1961 | Richards ____________ 206—65 |
| 3,270,869 | 9/1966 | Burt ______________ 206—45.33 |
| 3,270,870 | 9/1966 | Burt ______________ 206—45.33 |

FOREIGN PATENTS

| | | |
|---|---|---|
| 1,162,222 | 4/1958 | France. |
| 944,919 | 12/1963 | Great Britain. |

MARTHA L. RICE, Primary Examiner

U.S. Cl. X.R.

206—45.31, 45.33, 65